United States Patent [19]
Orthman

[11] 3,774,693
[45] Nov. 27, 1973

[54] AGRICULTURAL IMPLEMENT

[75] Inventor: Henry K. Orthman, Lexington, Nebr.

[73] Assignee: Orthman Manufacturing Inc., Lexington, Nebr.

[22] Filed: Dec. 23, 1970

[21] Appl. No.: 100,910

[52] U.S. Cl. .................. 172/311, 16/137, 16/135
[51] Int. Cl. .............................................. A01b 49/00
[58] Field of Search ............... 172/452, 456, 478, 172/491, 311, 132, 624; 244/49

[56] References Cited
UNITED STATES PATENTS

| | | | |
|---|---|---|---|
| 3,376,050 | 4/1968 | Lohrman | 172/311 X |
| 2,719,682 | 10/1955 | Handel | 244/49 |
| 2,641,886 | 6/1953 | Graham | 172/311 |
| 3,298,446 | 1/1967 | Anderson | 172/456 |
| 3,314,386 | 4/1967 | Kopaska | 172/456 X |
| 3,505,704 | 4/1970 | Hornung et al. | 172/311 X |
| 3,529,672 | 9/1970 | Smith | 172/132 X |

Primary Examiner—Robert E. Pulfrey
Assistant Examiner—Stephen C. Pellegrino
Attorney—Zarley, McKee & Thomte

[57] ABSTRACT

A farm implement having a tool bar including a hollow main frame and oppositely extending wing sections pivotal between horizontal and vertical positions. A hydraulic cylinder is positioned inside the opposite ends of the hollow main frame and engages an ear on the adjacent wing section extending into the main frame when in a lowered position. Upstanding aligned apertured ears on the ends of the main frame and wing sections provide hinges therebetween. The ear on the wing sections extending into the opening in the end of the main frame is limited against lateral movement by being received in a notch in the base plate on which the hydraulic cylinder is carried for removably attaching the cylinder in the hollow main frame.

17 Claims, 5 Drawing Figures

PATENTED NOV 27 1973 3,774,693
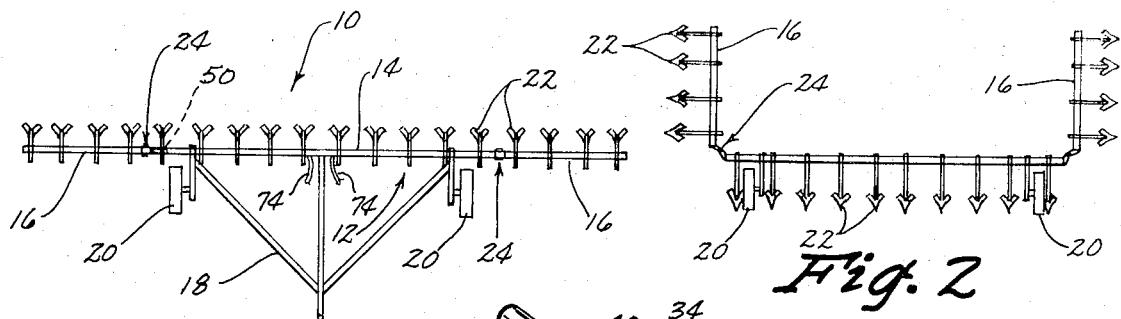
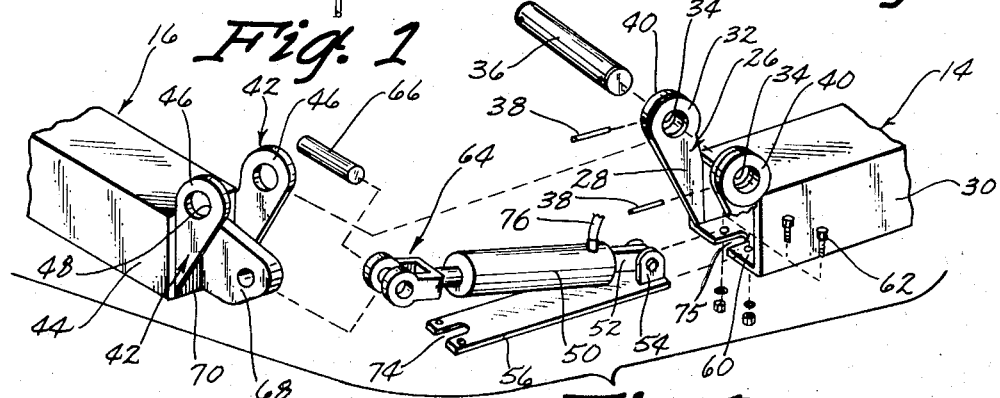
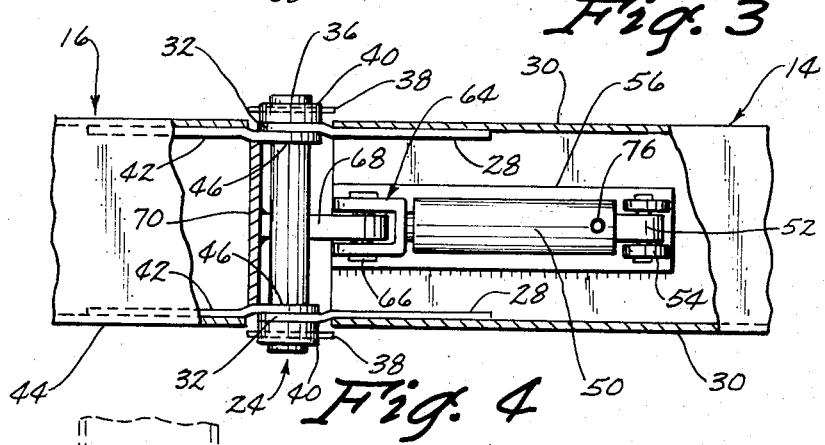
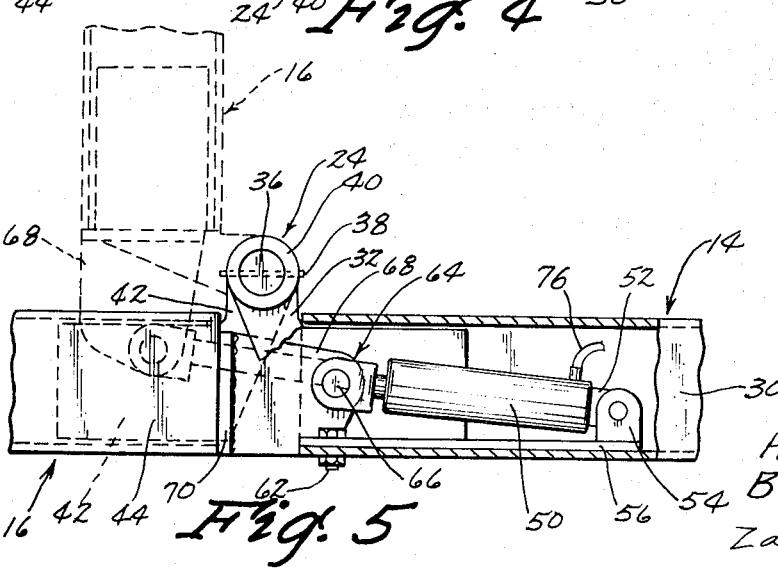
INVENTOR
HENRY K. ORTHMAN
BY
Zarley, McKee & Thomte
ATTORNEYS

AGRICULTURAL IMPLEMENT

The tool bars on conventional farm implements wherein wing sections are utilized involve cumbersome hinges and power components on the tool bar which occupy considerable space thereby making it necessary to extend subframes rearwardly from the main tool bar frame to carry the necessary ground working tools in the area of the hinge and power assembly for raising and lowering the wing sections. These tool bars also suffer from the deficiency of having inadequate strength to resist damage from lateral strain placed on the wing sections when lowered and thus may require substantial reinforcing rods.

The farm implement tool bar of this invention is designed to carry ground engaging tools along its substantial length since a minimum of space is occupied by the hinge and power means for raising and lowering the wing sections. This is made possible by positioning a hydraulic cylinder inside the opposite ends of the main frame of the tool bar and providing an ear extending into the hollow ends of the main frame for engagement with the hydraulic cylinder. A hinge is placed immediately above the top side of the main frame and wing sections and occupies a minimum of space on the tool bar. The hydraulic cylinders are completely enclosed in the hollow tool bar main frame and wing sections when the wing sections are in the lowered horizontal position.

Additional lateral strength is added to the tool bar by the ear on the wing sections being received in a notch in the base plate supporting the hydraulic cylinder in each end of the main frame. The sidewalls of the notch function as stop elements limiting lateral movement of the wing sections. The base plate is at a point furtherest from the pivotal hinge axis and thus maximizes the total strength of the tool bar in the area of the hinges.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a plan view of a farm implement utilizing the tool bar of this invention;

FIG. 2 is a fragmentary front elevational view showing a wing section pivoted to a raised vertical position;

FIG. 3 is a fragmentary exploded perspective view of the hinge and hydraulic cylinder interconnecting the hollow main frame and the wing section of the tool bar;

FIG. 4 is a fragmentary top plan view of the hinge and hydraulic cylinder with the wing section in its lowered horizontal position; and FIG. 5 is a fragmentary side elevational view thereof.

The agricultural implement of this invention is referred to generally in FIG. 1 by reference numeral 10 and includes a tool bar 12 including a main frame 14 and wing sections 16. A tongue assembly 18 is secured to the main frame 14 adjacent ground support wheels 20. The ground engaging tools on the tool bar are shovels 22 uniformly spaced along the length of the tool bar and it is understood that any desired tool or arrangement of tools could be secured to the tool bar.

The main frame 14 and the wing sections 16 are hollow throughout their length and rectangular in transverse cross section. A hinge 24 between the main frame 14 and the wing sections 16 is formed by side plates 26 having lower portions 28 extending into the hollow open end of the main frame 14 in mating engagement with the side walls 30. The plates have upstanding ears 32 which are provided with aligned apertures 34 to receive a pin 36 held in place by lock pins 38 extending through annular shoulders 40 secured to the ears 32. The hollow wing sections 16 also includes a pair of plates 42 in mating engagement with the side walls 44 and have upstanding ears 46. The ears 46 include apertures 48 extending in alignment with the apertures 34 on the ears 32 on the main frame.

A hydraulic cylinder 50 is secured at its inner end 52 to upstanding post 54 on a base plate 56 which in turn is detachably connected to the base wall 60 of the main frame 14 by bolts 62. The outer free end 64 of the cylinder 50 is connected by a pin 66 to a horizontally disposed ear 68 on a transversely extending plate 70 extending between the plates 42 in the wing section 16. A notch 74 is formed in the base plate 56 to receive the connecting ear 68 on the wing section 16 when it is in its lowered position as seen in FIG. 5, to limit lateral movement of the wing section 16 to assist and relieve the strain on the hinge 24. A notch 75 in wall 60 registers with notch 74.

The hydraulic cylinder 50 may be operated through the hydraulic controls on a conventional tractor and as shown a single acting cylinder may be used having a single hydraulic line 76. Gravity can cause the wing sections to be returned to their horizontal position. If desired, of course, a double acting cylinder may be substituted for the single acting cylinder.

In operation it is seen that the hinge connection between the wing section 16 and the main frame 14 of the implement tool bar 12, may be easily accomplished by insertion of the hinge plates 26 and 42 into the respective open ends of the main frame 14 and the wing sections 16. The hydraulic cylinder 50 is positioned in the open main frame 14 and is connected at its outer end to the ear 68 on the wing section 16. Operation of the hydraulic controls will cause the wing section 16 to pivot upwardly to a vertical position, as seen in FIG. 5 in the dash lines or to its lowered horizontal position indicated by the solid lines. The hydraulic cylinder 50 is totally enclosed when the wing section is in its lowered position and the hydraulic cylinder occupies no external space around the tool bar 12 thus leaving the entire tool bar free for ground working tools 22 to be attached thereto. The hinge 24 is the only externally located structure between the main section 14 and the wing section 16 and this occupies a minimum of space which will not inconvenience attachment of working tools to the tool bar. The power cylinder 50 may be easily removed from the main frame section 14 by removing the bolts 62. If desired, the base plate 56 may be welded through the open end of the main frame section 14 along its entire length on each side thereof.

I claim:

1. An agricultural implement comprising, a frame having a tool bar carrying ground working tools thereon along its substantial length; said tool bar including a main frame and at least one wing section pivotally movable between raised and lowered positions, a hinge pivotally interconnecting said wing section and main frame, said main frame having an elongated opening in its end adjacent said wing section, a hydraulic cylinder positioned in said opening and pivotally connected to said wing section at a point remote from the pivotal axis of said hinge, said wing section including an ear connected to said cylinder which extends into said opening in said main frame when said wing section is in said lowered position, stop means being provided inside said opening on opposite sides of said ear for limiting pivotal movement of said wing section about an axis perpendicular to the pivotal axis of said hinge, said stop means having a notch formed in a base plate positioned in said opening, said ear being received in said notch when said wing section is in said lowered position.

2. The structure of claim 1 wherein said pivotal axis of said hinge is between and above the adjacent ends of said main frame and said wing section.

3. The structure of claim 1 wherein said base plate is detachably secured to a bottom ball of said main frame in said opening, and said hydraulic cylinder is secured to said base plate.

4. The structure of claim 1 wherein said cylinder is disposed entirely within said opening when said wing section is in said lowered position.

5. The structure of claim 4 wherein said hinge includes upstanding aligned apertured ears on said wing section and said main frame and a pin extends through said aligned apertures.

6. The structure of claim 1 wherein a wing section is provided at the opposite end of said main frame from said first wing section.

7. The structure of claim 1 wherein said wing section and main frame are hollow throughout their substantial length and rectangular in transverse cross section.

8. The structure of claim 6 wherein stop means are provided inside said opening on opposite sides of said ear for limiting pivotal movement of said wing section about an axis perpendicular to the pivotal axis of said hinge.

9. An agricultural implement comprising,
a frame having a tool bar carrying ground working tools thereon along its substantial length; said tool bar including a main frame and at least one wing section pivotally movable between raised and lowered positions,
a hinge pivotally interconnecting said wing section and main frame,
said main frame having an elongated opening in its end adjacent said wing section,
a hydraulic cylinder being secured to said main frame and positioned in said opening and pivotally connected to said wing section at a point remote from the pivotal axis of said hinge,
said wing section includes an ear connected to said cylinder and said ear extends into said opening in said main frame when said wing section is in said lowered position.

10. The structure of claim 9 wherein said hydraulic cylinder is detachably secured in said opening of said main frame by detachable fastening means operatively connecting said cylinder to said main frame and said fastening means is operatively exposed.

11. The structure of claim 10 wherein said detachable fastening means includes a removable base plate positioned within said opening in said main frame and secured to said main frame, and said hydraulic cylinder is secured to said main frame by being secured to said base plate whereby said hydraulic cylinder can be removed by removing said base plate.

12. The structure of claim 10 wherein said base plate is secured to the bottom wall of said main frame by detachable fastening means and said fastening means is exposed to the exterior of said elongated opening.

13. An agricultural implement comprising,
a frame having a tool bar carrying ground working tools thereon along its substantial length; said tool bar including a main frame and at least one wing section pivotally movable between raised and lowered positions,
a hinge pivotally interconnecting said wing section and main frame,
said main frame having an elongated opening in its end adjacent said wing section,
a hydraulic cylinder being secured to said main frame and positioned in said opening and pivotally connected to said wing section at a point remote from the pivotal axis of said hinge,
cooperating stop means are provided on the adjacent ends of said wing section and main frame opposite said hinge to limit relative lateral movement therebetween when said wing section is in said lowered position, and when said wing section is in said raised position said cooperating stop means are disengaged from each other.

14. The structure of claim 13 wherein said hydraulic cylinder is detachably secured in said opening of said main frame by detachable fastening means operatively connecting said cylinder to said main frame and said fastening means is operatively exposed.

15. The structure of claim 14 wherein said detachable fastening means includes a removable base plate positioned within said opening in said main frame and secured to said main frame, and said hydraulic cylinder is secured to said main frame by being secured to said base plate whereby said hydraulic cylinder can be removed by removing said base plate.

16. The structure of claim 14 wherein said base plate is secured to the bottom wall of said main frame by detachable fastening means and said fastening means is exposed to the exterior of said elongated opening.

17. The structure of claim 14 wherein said hinge includes upstanding aligned apertured ears on the exterior of said wing section and said main frame and a pin extends through said aligned apertures.

* * * * *